US010198394B2

(12) United States Patent
Jen et al.

(10) Patent No.: US 10,198,394 B2
(45) Date of Patent: Feb. 5, 2019

(54) REDUCED PIN COUNT INTERFACE

(71) Applicant: Intel Corporation, Santa Clara, CA (US)

(72) Inventors: Michelle Jen, Mountain View, CA (US); Dan Froelich, Portland, OR (US); Debendra Das Sharma, Saratoga, CA (US); Bruce Tennant, Hillsboro, OR (US); Quinn Devine, Chandler, AZ (US); Su Wei Lim, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 15/283,310

(22) Filed: Oct. 1, 2016

(65) Prior Publication Data

US 2017/0344512 A1 Nov. 30, 2017

Related U.S. Application Data

(60) Provisional application No. 62/340,750, filed on May 24, 2016.

(51) Int. Cl.
| G06F 13/00 | (2006.01) |
| G06F 13/42 | (2006.01) |
| G06F 13/38 | (2006.01) |
| G06F 13/40 | (2006.01) |
| H04L 29/06 | (2006.01) |
| H04L 29/08 | (2006.01) |

(52) U.S. Cl.
CPC ........ *G06F 13/4282* (2013.01); *G06F 13/385* (2013.01); *G06F 13/4068* (2013.01); *G06F 13/387* (2013.01); *H04L 67/1095* (2013.01); *H04L 69/08* (2013.01)

(58) Field of Classification Search
CPC ....... G06F 13/385; G06F 13/387; H04L 69/08
See application file for complete search history.

(56) References Cited

U.S. PATENT DOCUMENTS

| 7,257,655 B1 | 8/2007 | Burney et al. |
| 8,972,640 B2 | 3/2015 | Wagh |
| 2010/0284451 A1 | 11/2010 | Murari |

(Continued)

FOREIGN PATENT DOCUMENTS

CN 103164314 A 6/2013

OTHER PUBLICATIONS

International Search Report and Written Opinion issued in PCT Application No. PCT/US2017/027720 dated Sep. 5, 2017; 9 pages.

(Continued)

*Primary Examiner* — Zachary K Huson
(74) *Attorney, Agent, or Firm* — Alliance IP, LLC

(57) ABSTRACT

An apparatus is provided that includes a set of registers, and an interface of a computing block. The computing block includes one of a physical layer block or a media access control layer block. The interface includes one or more pins to transmit asynchronous signals, one or more pins to receive asynchronous signals, and a set of pins to communicate particular signals to access the set of registers, where a set of control and status signals of a defined interface are mapped to respective bits of the set of registers.

20 Claims, 10 Drawing Sheets

(56) References Cited

U.S. PATENT DOCUMENTS

| 2015/0117504 | A1* | 4/2015 | Harriman | G06F 13/385 |
| | | | | 375/224 |
| 2015/0220140 | A1 | 8/2015 | Por et al. | |
| 2016/0162427 | A1* | 6/2016 | Kang | G06F 13/387 |
| | | | | 710/313 |

OTHER PUBLICATIONS

PCT International Preliminary Report on Patentability in PCT International Application Serial No. PCT/US2017/027720 (7 pages).

* cited by examiner

| Address | Bits | Signal Name |
|---|---|---|
| 12'h000 | [3:0] | PHY Mode[3:0] |
| | [4] | Elasticity Buffer Mode |
| | [5] | TxDetectRx/Loopback |
| | [6] | TxElecIdle |
| | [7] | <Reserved> |
| 12'h001 | [1:0] | TX Pattern[1:0] |
| | [2] | TxCompliance |
| | [3] | TxOnesZeros |
| | [4] | RxPolarity |
| | [5] | RxEqTraining |
| | [7:6] | <Reserved> |

REDUCED PIN COUNT INTERFACE

This application claims benefit to U.S. Provisional Patent Application Ser. No. 62/340,750, filed May 24, 2016 and incorporated by reference herein in its entirety.

FIELD

This disclosure pertains to computing system, and in particular (but not exclusively) to computer interfaces.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. As the processing power grows along with the number of devices in a computing system, the communication between sockets and other devices becomes more critical. Accordingly, interconnects, have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Interconnect architectures may be based on a variety of technologies, including Peripheral Component Interconnect Express (PCIe), Universal Serial Bus, and others.

DETAILED DESCRIPTION

Figure 1:
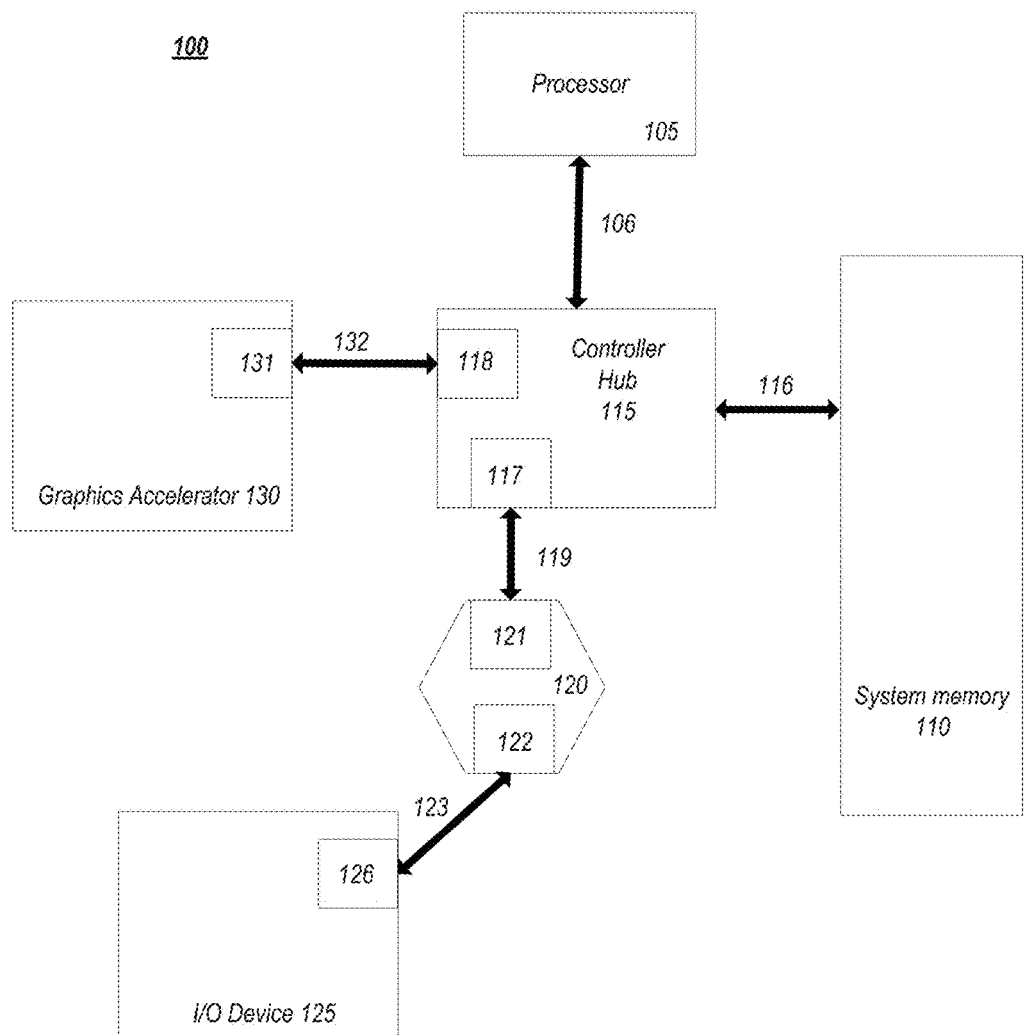
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. It should be appreciated that one or more of the components (e.g., 105, 110, 115, 120, 125, 130) illustrated in FIG. 1 can be enhanced to execute, store, and/or embody logic to implement one or more of the features described herein.

Figure 2:
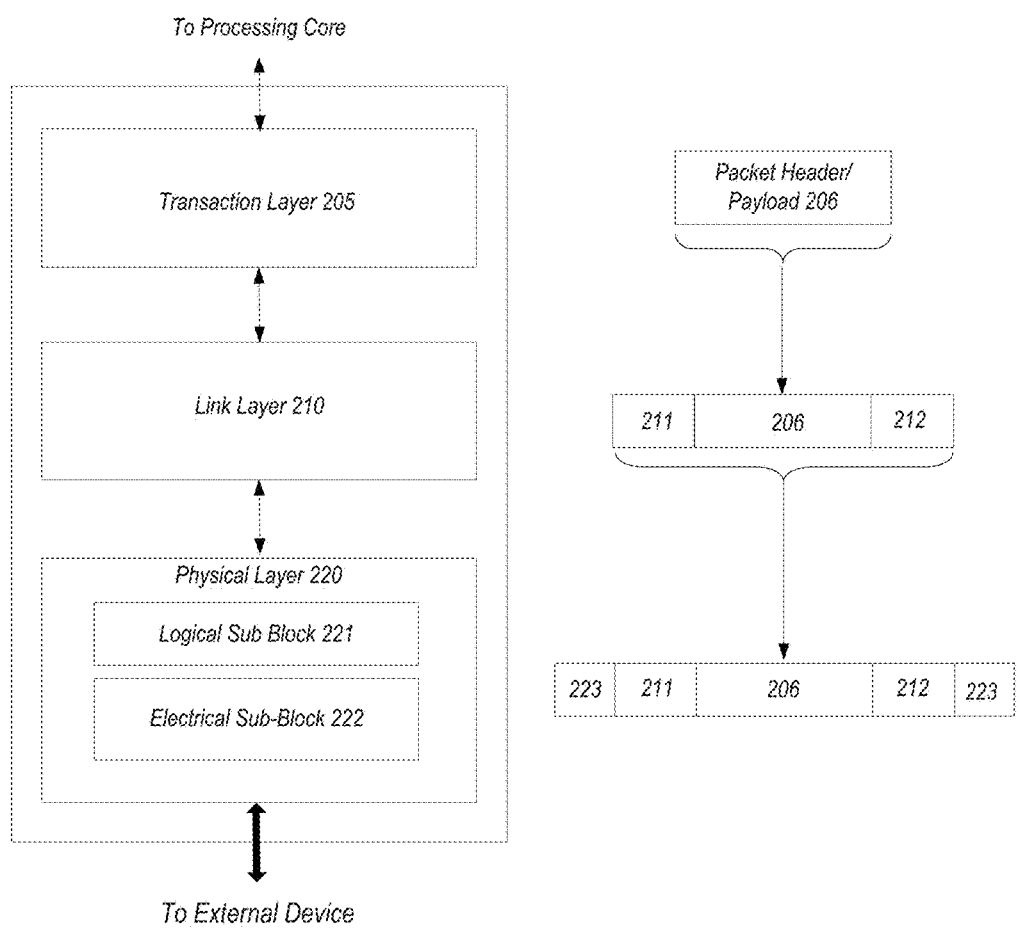
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
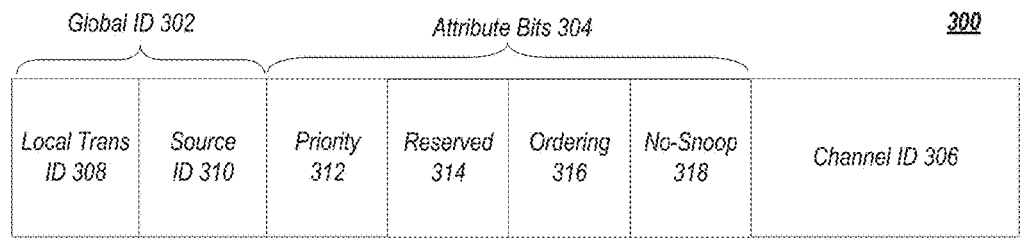
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
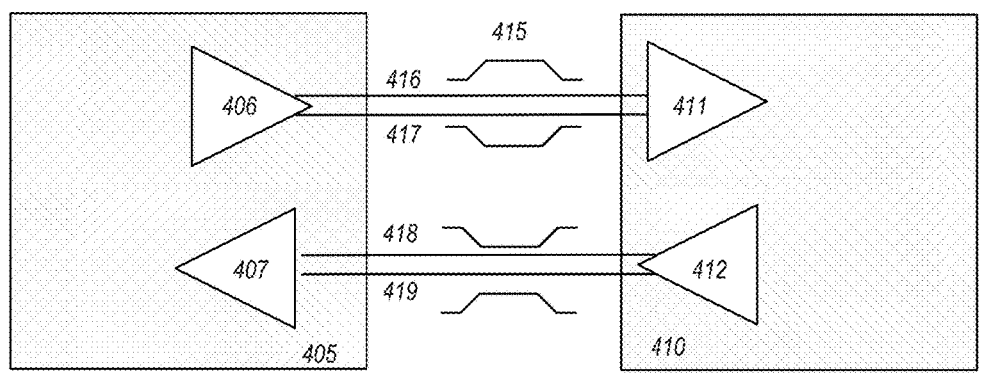
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., Displayport) may not and may even including only transmit or only receive pairs, among other examples.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a data link layer or logical physical layer can include a controller or embody a media access control (MAC) layer. In some implementations, the physical (PHY) layer (e.g., its logic and/or physical fabric) can be provided as a separate intellectual property (IP), or computing, block, which can be coupled with other computing block providing other portions of the hardware logic to implement an interconnect stack. To enable such implementations, an interface can be provided to connect the computing blocks while still supporting a particular interconnect protocol (or potentially multiple different interconnect protocols) over the resulting interconnect (e.g., provided by the interconnected computing blocks). As an example, the PHY Interface for the PCI Express architecture (PIPE) has been developed to define such interfaces. Indeed, PIPE has been extended to enable interfaces between controllers and PHYs in now multiple different interconnect technologies, including not only PCIe, but also SATA and USB architectures. PIPE is intended to enable the development of functionally equivalent PCI Express, SATA and USB PHY's. Accordingly, PHYs can be delivered as discrete integrated chip packages (ICs) or as macrocells for inclusion in ASIC designs or other systems. The specification defines a set of PHY functions which must be incorporated in a PIPE compliant PHY. PIPE is defined to provide a standard interface between such a PHY and a Media Access Layer (MAC) and/or Link Layer ASIC. A standardized PHY interface, such as PIPE, can provide an interface to which ASIC and endpoint device vendors can develop.

Figure 5:
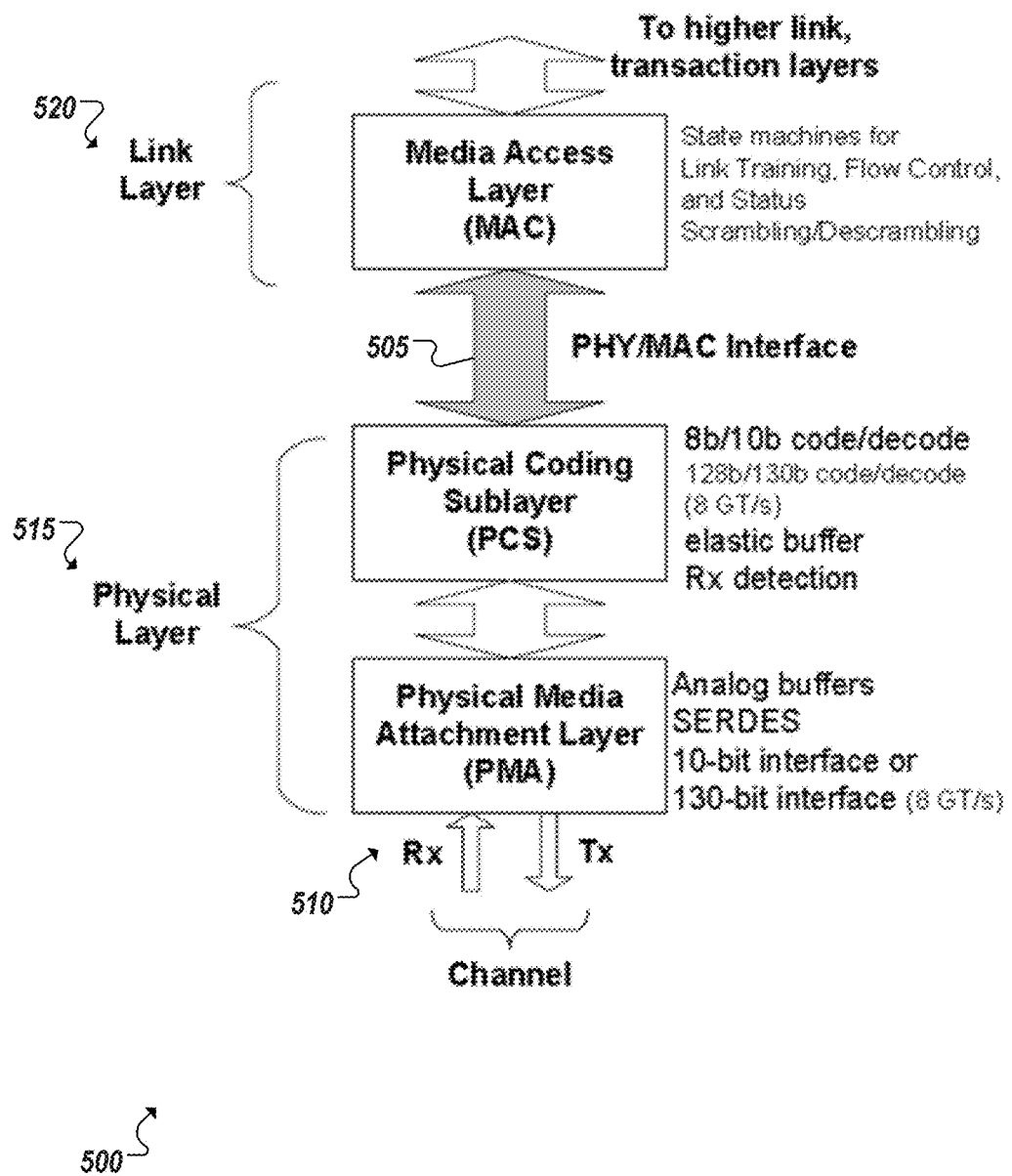
FIG. 5 illustrates a representation of a PHY/MAC interface.

FIG. 5 is a simplified block diagram 500 illustrating a defined interface 505 between a PHY and a MAC layer (e.g., implemented as two or more distinct computing blocks (or "IP blocks"). In this example, data transmitted or received over a physical channel 510 is processed by PHY layer logic 515. In one example, PHY layer logic 515 can include a physical media attachment (PMA) layer and a physical coding sublayer (PCS. The PMA can include analog buffers, a serializer/deserializer (SERDES) and an interface (to the channel 510) (e.g., a 10-bit or 130-bit interface), among other example logic and elements. The PCS can include coding/decoding logic (e.g., 8b/10b code/decode or 128b/130b code/decode), an elastic buffer, and receiver detection logic, among other example logic and elements. In this example, all or a portion of the PHY layer logic 515 can be embodied on a computing block separate from another computing block embodying all or a portion of link layer logic 520. Link layer logic 520 can include controller logic, such as a media access control (MAC) layer and interface with higher link and transaction layers in a protocol stack. In one example, the MAC layer can include state machines for link training, flow control, and status, scrambling and descrambling logic, among other example logic and elements. While the example of FIG. 5 shows the MAC layer as part of the link layer, in other implementations, the MAC layer (or other controller layer) may be a part of the logical PHY layer and a register-based interface (adopting at least some of the features described herein) can connect the logical PHY to the analog or physical PHY, among other examples.

A defined interface between a controller and PHY can attempt to define a standardized interface between the controller and PHY including the definition of control and status signals for transmission between the computing blocks implementing the controller and PHY in connection with management of the interface and support of one or more interconnect protocols on a link. For instance, PIPE defines an interface between a MAC and PHY using dedicated control and status signal wires for each operation involving communication between the MAC and the PHY. The number of PIPE signals has grown over time as each of the protocol specifications PIPE supports (e.g. PCIe, SATA, USB) evolves (and as additional protocols are added for support through PIPE). Indeed, recent work on PIPE has attempted to add support for USB Type-C, which includes support for Displayport, Thunderbolt, and configurable Rx/Tx lane pairs, among other examples. Such improvements, however, would result in a significant increase of the signal wire (and pin) count of the PIPE interface using the current scheme of dedicated signals for each operation. Indeed, the traditional PIPE interface is reaching a point where the escalating pin count threatens its future scalability and usability.

The present Specification presents features and example implementations that address at least some of the issues above. For instance, in one example, escalating signal and pin count of a defined MAC-PHY can be addressed by providing a low pin count version of the defined interface (e.g., a PIPE interface) through the utilization of a register-based status and control interface. In some example interfaces, a set of datapath signals and control and status signals can be defined. For instance, the current PIPE interface defines datapath signals and control and status signals per Rx/Tx lane pair (and other interfaces may additionally support configurable pairs where pairs are configured either as {Rx, Tx}, {Rx, Rx}, {Tx, Tx} or {Tx, Rx}, etc.). As new signals are added to the interface definition, this may result in additional pins being provided to accommodate the new signals. In one embodiment, a low pin count version of a traditional PIPE interface can be implemented, for instance, by providing an interface that maintains dedicated wires for datapath signals, asynchronous control and status signals, and latency-sensitive control and status signals, but that maps remaining control and status signals defined for the interface to registers (e.g. 8-bit, 16-bit, or 32-bit registers), which can be accessed over a small number of additional pins/wires, such as wires facilitating data transmission of 4-bits, 8-bits, etc. per direction. To support messaging of these control and status signals using the registers, an address space can be provided (e.g., 12 address bits), into which the defined registers are mapped. In some implementations, this address space can be designed to be deliberately large to accommodate expansion of the set of operations, control and status signals, that are to use these defined registers. This allows plenty of headroom for future expansion as well as room to house vendor-specific registers that PHY designs can use to expose useful status information to the controller or to provide additional configurability.

Continuing with the above example, to facilitate messaging of these control and status signals using the registers, read, write, completion, and other commands may be newly defined for accessing the registers. Included is a mechanism for grouping multiple writes together so that they take effect in the same cycle. Included is also a mechanism for distinguishing between 1-cycle assertion type signals and signals that are held to a constant value. A transaction involving these registers may include command, address, and data or any subset of these three elements, which may be transferred over the small set of wires in a time multiplexed manner (e.g., over multiple unit intervals or clock cycles). A framing scheme can also be defined in connection with the interface, by which a corresponding computing block may identify boundaries (e.g., start and end) of potentially multiple sequential (or contemporaneous) register transactions, each transaction serving to communicate one or more control or status signals in lieu of these same signals being driven over dedicated wires, as is done, for instance, in traditional PIPE interfaces, among other example features.

As introduced above, some implementations of an improved MAC-PHY interface can enable a defined interface to be extended to support complicated and large signal sets (e.g., such as when extending PIPE specification support for USB Type-C), while at the same time reducing the interface's signal and pin count. To illustrate, the current PIPE interface signal count would roughly need to double to support Type-C configurable pairs, which would make PIPE compliant Type-C designs very challenging to implement from a physical design point of view. An improved interface design, which offloads some signals, previously using dedicated wires, to specialized registers, may also provide the ability to enable more interface operations in the future, as the protocols supported by the interface (e.g., PIPE) evolve to add new features, all while saving the interface from further increases in interface signal count.

Figures 6, 8:
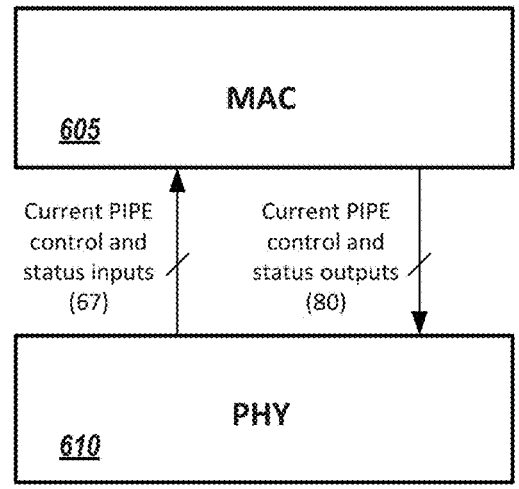
FIG. 6 illustrates a representation of a first version of a PIPE PHY/MAC interface.
FIG. 8 illustrates a representation of a portion of an example status and control register of an example PHY/MAC interface.

Turning to FIG. 6, a simplified block diagram 600 is shown of a conventional PIPE interface coupling a MAC computing block 605 with a PHY computing block 610. The interface can include a control and status interface (for control and status signaling) with roughly 67 control and status inputs and 80 control and status outputs per lane (i.e., Rx/Tx pair). As such an interface implementing a multi-lane design would replicate each of these signals per lane, potentially resulting in exponential growth of the overall pin count dedicated to supporting this control and status interface.

Figure 7:
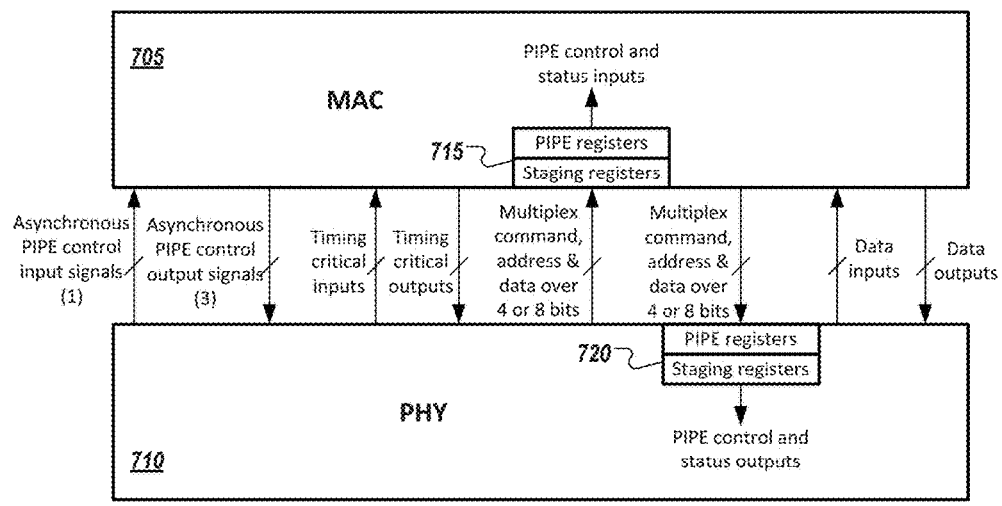
FIG. 7 illustrates a representation of a second, register-based version of a PIPE PHY/MAC interface.

Turning to FIG. 7, a simplified block diagram 700 is shown of an improved PIPE interface utilizing a register-based, low pin count PIPE control and status interface. The interface is adapted for coupling a MAC computing block 705 with a PHY computing block 710. In one example, subsets of the control and status signals defined for the interface can be categorized as either asynchronous signals, timing critical signals, and regular control and status signals. The asynchronous and timing critical control and status signals may be assigned dedicated wires on the improved interface, such as shown in FIG. 7. The regular control and status signals, however, may be mapped into and replaced by the bits of registers (e.g., 715, 720), which are accessed over a small set of wires (e.g. four or eight bits) as shown in the present example. Register commands, e.g. reads and writes, register address, and register data may be transmitted in a time-multiplexed manner across this small serial interface. Further, the datapath related signals of the interface may be separate from the control and status signals and may, in effect, be the same or very similar to those provided in conventional interface implementations (e.g., traditional PIPE interfaces).

Turning to FIG. 8, a table 800 is illustrated showing an example of how some of the PIPE control and status signals can be mapped into 8-bit PIPE registers. While the example of FIG. 8 illustrated a small subset of the numerous control and status signals that may be mapped to register bits in a computing block, it should be appreciated that, in practice, potentially all of the control and status signals of a defined link layer-physical layer interface (e.g., PIPE) may be mapped to register bits (e.g., with exceptions for the asynchronous and timing critical control signals, which may remain implemented through dedicated wires). Further, while the example of FIG. 8 shows an 8-bit register, other potential register widths can just as easily be used, including 16- or 32-bit registers, etc. In one example implementation, MAC→PHY control and status signals can be mapped to a first address space corresponding to the register of the PHY computing block, while PHY→MAC control and status signals can be mapped to a second address space corresponding to the register of the MAC computing block. In some cases, the first and second address spaces can utilize independent address spaces, such that the same address may potentially be used in each of the PHY's and MAC's register. In other example, a common, or shared, address space can be utilized such that first and second address spaces are non-overlapping, with each register in the PHY and MAC having a unique address. In one example, MAC→PHY control and status signals can be mapped into an address space starting at address zero, while the PHY→MAC control and status signals can be mapped into another address space starting at address zero. In the example of FIG. 8, a 12-bit address space is shown, which may be considered large enough to accommodate the currently defined PIPE signals with plenty of headroom for future signal growth, however, other address space sizes can be chosen in other examples. A large address space may be utilized in connection with the registers to enable room for a dedicated address range for vendor specific registers that can be used to expose useful PHY status information and/or to provide additional configurability. In still other examples, different sized address spaces can be provided that can be accessed via different commands, depending on latency requirements of transmitting the full command plus address bits across the serial interface, among other example implementations.

Bits within a set of status/control registers of an example PHY/MAC interface can be mapped to defined signals in a set of signals defined or extended in the PHY/MAC interface (e.g., the signals defined in the PIPE specification). In one implementation, when a "1" is written to a bit mapped to a particular signal, this value is interpreted the same as if the particular signal were received in an implementation of the interface that provides dedicated wires to each of the signals. As an example, a first computing block may determine that a TxDetect state should be entered and can message this to the other computing block by preparing a write (to be sent over a subset of the pins of the interface designated as the status and control interface of the PHY/MAC interface), which causes a "1" to be written to corresponding bit (e.g., 12'h000[6]) to indicate the signal "TxDetectRx/Loopback" (e.g., as in the example of FIG. 8). The receiving, second computing block can detect that the "1" has been written to bit 6 of the register at address 12'h000 and interpret this value as the receipt of the PIPE TxDetectRx/Loopback signal, among other potential examples.

TABLE 1

Example of Register Commands

| Encoding | Command | Description |
| --- | --- | --- |
| 4'b0000 | NOP | Used during idle periods |
| 4'b0001 | write_committed | Indicates that the current write as well as any previously uncommitted writes should be committed, e.g. their values should be updated in the PIPE registers. Contains address and data. |
| 4'b0010 | write_uncommitted | Indicates that the current write should be saved off and its associated values are updated in the PIPE registers at a future time when a write_committed is received. Contains address and data. |
| 4'b0011 | read | Contains address. |
| 4'b0100 | read completion | This is the data response to a read. Contains data only. |
| Others | Reserved | Reserved |

Table 1 provides examples of some register commands for use in accessing registers maintained in connection with control and status signals defined for a MAC-PHY interface, such as PIPE. For instance, a no operation (or "NOP") command can be utilized to indicate that there is no operation being requested (e.g., for use during idle states). Write operations can be used to replace transmission of one or more of a set of control and status signals defined for the interface. For instance, a write can write a value to a particular bit of a particular register mapped to a particular one of the set of control and status signals. The value of the particular bit can be interpreted as the receipt of the particular signal (even though the particular signal was not actually sent (e.g., as the dedicated wire has been omitted in the improved interface design)).

In some instances, an interface can provide for a combination of signals in the set of control and status signals to be sent at the same time. For instance, certain PIPE signals may need to be aligned so that their values take effect during the same cycle. In a conventional version of the interface, this combination of signals can be transmitted concurrently each on their respective wires. In an improved implementation based on registers, it may not be feasible to concurrently write to each of the register bits corresponding to the combination of signals (e.g., the bits may be scattered across multiple registers with multiple different addresses). In one example, write commands can include committed and uncommitted writes. For example, an uncommitted command can be used to provisionally write, or queue a write, to an identified register address corresponding to the command. Uncommitted writes can be held until the next committed write is received, at which point the values requested in the intervening uncommitted writes (e.g., since the last committed write) are written to their respective register bits together with the writing to the register requested in the committed write. For instance, an uncommitted write can be written to a buffer (that is flushed on a committed write) or to a shadow register to store the write until the next committed write is received and the status and control register is updated, while committed writes are written directly to the status and control register. In this manner, one or more uncommitted writes can be requested followed by a committed write to simultaneously write values to multiple different registers and bits so as to achieve alignment of the signals mapped to these bits.

As an example, in an implementation with 8-bit registers, 24 different signals (from a defined interface) can be mapped across three or more registers, such as registers A, B, and C. In one example, three signals mapped to three respective bits in register A, may need to be aligned with another signal mapped to a respective bit in register B, and two signals mapped to two respective bits in register C. In this particular illustrative example, to emulate the alignment of these signals, values can be written to the three bits in register A in a first write_uncommitted command, followed by a second write_uncommitted command to write the value to the bit in register B. Thereafter, a write_committed command can be utilized to not only write to the values of the two bits in register C, but also to "commit" and cause the uncommitted writes to registers A and B to be performed simultaneously with the writes to register C and thereby cause all the values associated with the writes to registers A, B, and C to take effect in the same cycle.

Additional operations can be provided in connection with the status and control registers of an improved interface. For instance, read and read completion commands can be provided for accessing values written to particular status registers. Acknowledgement (ACK) commands can also be defined, for instance, to indicate acknowledgement (i.e., to requesting computing block) that a committed or uncommitted write has been successful performed at a particular register.

Some implementations may omit support of a write_uncommitted command. For instance, in one implementations, the registers of a particular computing block can be defined in such a way, with width and signal assignments, that signals understood to need alignment are mapped to bits in the same register or adjacent registers, thereby making it possible to write to each of the corresponding bits in the register in a single committed write. Other potentially useful commands may include (but are not limited to) writes that span multiple adjacent registers, among other examples.

Figure 9:
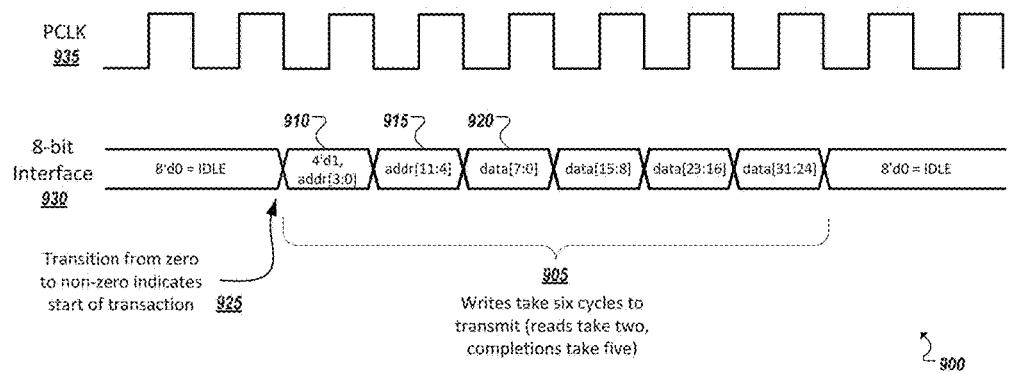
FIG. 9 illustrates a signaling diagram illustrating an example transaction involving a register of an example PHY/MAC interface.

Turning to FIG. 9, a signal diagram 900 is shown illustrating example signaling on an 8-bit status and control interface 930 of a MAC-PHY interface. 8-bits of data can be sent during each clock (PCLK) 935 cycle, or unit interval (UI). At startup, or following an idle state, zeros can be transmitted, as no control or status signals are being sent between the MAC and PHY blocks. When non-zero data is sent following an idle, the data can be interpreted as the beginning of a status/control transaction on the interface. For instance, in the example of FIG. 9, a first one of the computing blocks can determine that a particular one of the defined status and control signals is to be sent to the other computing block as defined by the interface. In a register-based implementation, the dedicated signaling pins have been omitted, and the first computing block instead sends data over the status and control interface. For instance, the transaction can begin (at 910) with a four bit register command (e.g., "4'd1") followed by the first four bits of the register address to which the command applies being transmitted in a first UI. In the next UI, the remaining 8 bits of the register's address are sent (at 915) followed by four UIs of data (32 bits) containing the values to be written to the 32 bit register (beginning at 920).

In some implementations, all status and control register transactions may contain a command. For write and read commands, the transaction can further include the associated register address. For writes and read completions, the transaction can also contain data (identifying contents of the register). As a result, the number of cycles it takes to transfer a transaction across the interface can be deduced from the command type. For instance, the example transaction shown in FIG. 9 involves a write command 905 transferred across an 8-bit serial interface, assuming a 4-bit command, 32-bit registers, and 12-bit address space, that is completed in 6 cycles (or UIs). Other transactions in this configuration will be expected to take a respective number of UIs to complete. For instance, a read may take two UI (e.g., for a 4-bit command and 12-bit address) and a read completion may take five UI (e.g., for a 4-bit command and 32-bits of read data), among other examples. Given the predictability of the length of these various transactions, the end of a transaction can be detected based on the transaction type. Consequently, the beginning of another transaction can likewise detected, for instance, when non-zero data immediately follows the UI or bits detected to represent the end of a preceding transaction. This can allow the omission of a transaction identifier in some implementations. Further, a start of transaction may likewise be detected when a valid command is received following an idle or null signal (e.g., 925), among other examples In some defined interfaces, such as PIPE, some existing status and control signals are defined based not only on the designated wire on which they are transmitted but also the duration at which the signal is held on the corresponding wire. Accordingly, in an implementation that replaces at least some of these dedicated signaling wires with a register mapping (such as described above), it can be desirable to enable the distinguishing of signals that require 1-cycle assertions from signals that need to be held over multiple UIs (e.g., at a static value). For instance, particular register bits or registers can be configured such that a value written to the bit is held at that value but then automatically returned to a default or un-asserted value (i.e., without requiring an explicit write transaction to return the value to the default (e.g., from "1" back to "0"). For instance, a particular bit may be mapped to a particular signal that has a 1-cycle assertion, such that when a "1" is written to the particular bit, the "1" is interpreted as an instance of the particular signal. However, rather than keeping the value of the particular bit at "1", after the expiration of the corresponding single UI, or cycle, the value can be automatically returned to "0". Likewise, signals that are to be held at a value for more than one UI can be mapped to register bits that are configured to be held at that value until the expiration of a defined number of cycles or until the bit is overwritten, among other examples. In some instances, bits with similar configurations can be grouped within the same register or consecutively addressed registers. For instance, the bits within a given register can all be mapped to respective single cycle signal assertions, such that the register is processed to always return values back to a default for any bit in the register. Other registers can be used to group other bits mapped to other signals with similarly equal signal assertion lengths, among other examples. In another implementation, 1-cycle assertion type signals and static value type signals can be distinguished simply by grouping the two different signal types into different registers that are located in different address spaces or different address ranges of the same address space, and interpreting their values based on their respective address. In still another implementation, different signal types can be mapped to different registers and accessed using different write command types (e.g., a static-type write and a single-cycle write, etc.), among other examples.

Figure 10:
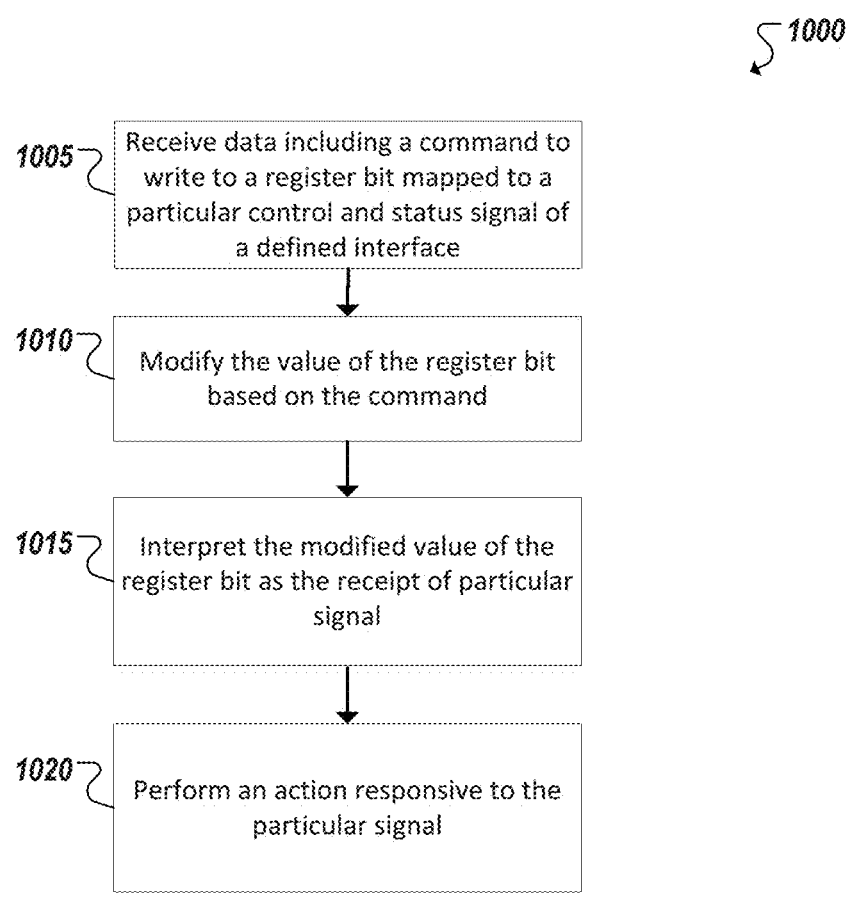
FIG. 10 is a flowchart illustrating example techniques within an example PHY/MAC interface.

FIG. 10 is a flowchart illustrating an example procedure corresponding to control and status signaling for a defined interface implemented using status and control registers (e.g., instead of dedicated signaling wires). For instance, data can be received 1005 over a subset of pins of an interface between a physical layer computing block and a link layer computing block, the subset of pins designated for use in accessing a set of registers utilized to replace dedicated signaling wires for signals of the defined interface. The data can include a command, an address of a particular one of the set of registers, and a value to be written to the particular register. The particular register can be modified 1010, or overwritten, with the value such that one or more bits of the particular register are changed by the write. Each of the bits of the register can be mapped to one of a plurality of different status and control signals of the defined interface (that were provided dedicated signaling wires in other embodiments of the defined interface), and the writing of a particular value (e.g., a "1") to any one of the bits can replace the receipt of the corresponding signal on a dedicated wire. Accordingly, one or more modified register bit values can be detected and interpreted 1015 as the receipt of corresponding signals of the defined interface. The computing block (e.g., hosting the register and "receiving" the particular signal) can then perform 1020 a corresponding action responsive to the receipt of the particular status or control signal identified in the register. For instance, depending on the nature of the particular status and control signal, a receiving computing block can perform 1020 actions such as changing the frequency of operation, changing the power state, changing transmitter coefficient settings, among other examples. Additional tasks can also be performed in connection with a status and control transaction over a reduced-pin, register-based interface. For instance, the computing block can detect that a particular register bit or associated signal is a 1-cycle or static value signal type and determine whether to automatically return the written-to bit to a default value or to use a particular type of write command to facilitate the accurate representation of the signal in the register. A computing block can additionally identify boundaries between a first transaction and second transaction by identified an expected length of the first transaction based on the command utilized in the first transaction, among other example tasks.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 11:
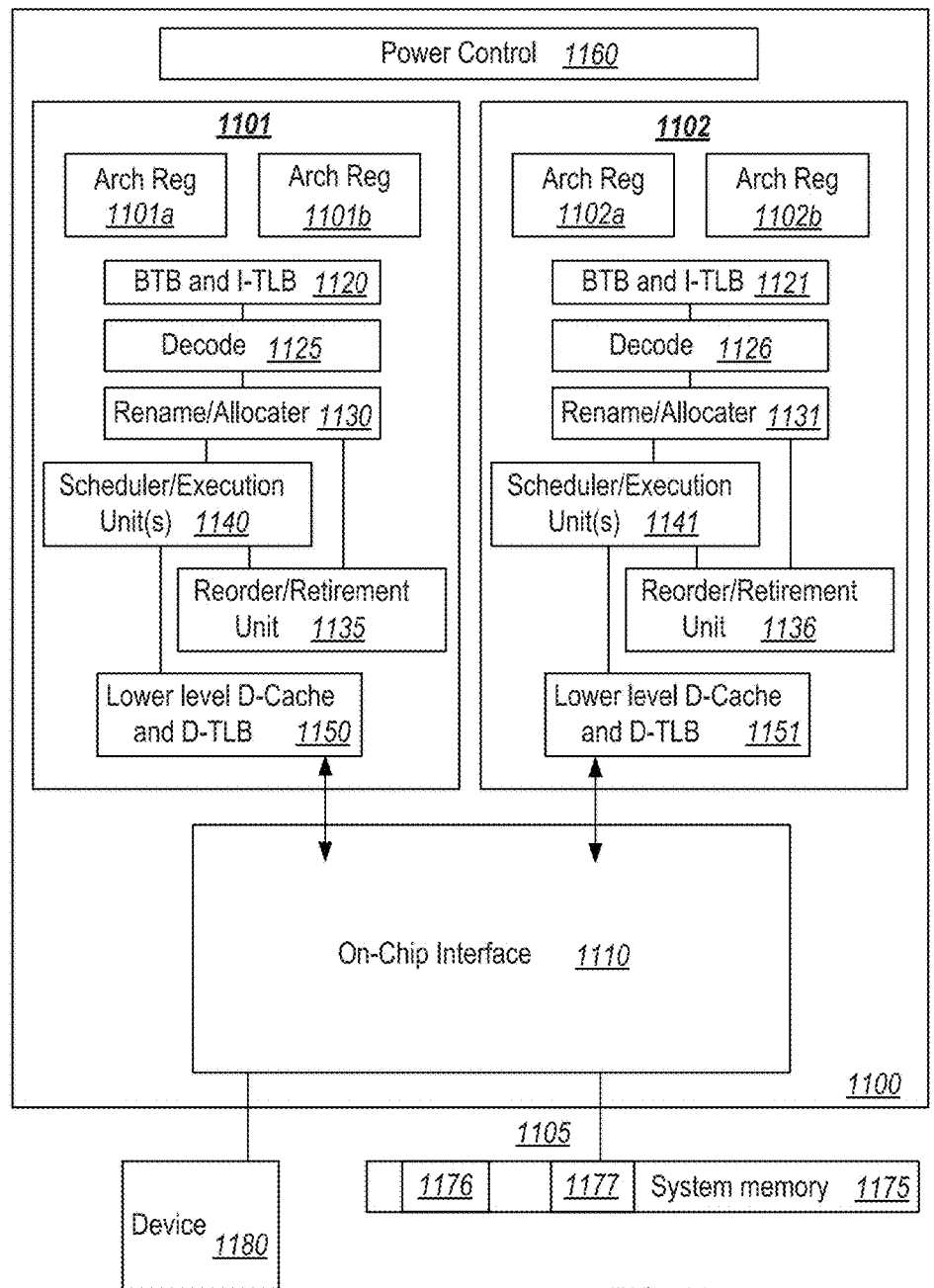
FIG. 11 illustrates an embodiment of a block diagram for a computing system including a multicore processor.

Referring to FIG. 11, an embodiment of a block diagram for a computing system including a multicore processor is depicted. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—core 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 11, includes two cores—core 1101 and 1102. Here, core 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 1101 are described in further detail below, as the units in core 1102 operate in a similar manner in the depicted embodiment.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 11, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, as discussed in more detail below decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1126, in one embodiment, recognize the same ISA (or a subset thereof). Alternatively, in a heterogeneous core environment, decoders 1126 recognize a second ISA (either a subset of the first ISA or a distinct ISA).

In one example, allocator and renamer block 1130 includes an allocator to reserve resources, such as register files to store instruction processing results. However, threads 1101a and 1101b are potentially capable of out-of-order execution, where allocator and renamer block 1430 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache, such as a second level cache associated with on-chip interface 1110. Note that higher-level or further-out refers to cache levels increasing or getting further way from the execution unit(s). In one embodiment, higher-level cache is a last-level data cache—last cache in the memory hierarchy on processor 1100—such as a second or third level data cache. However, higher level cache is not so limited, as it may be associated with or include an instruction cache. A trace cache—a type of instruction cache—instead may be coupled after decoder 1125 to store recently decoded traces. Here, an instruction potentially refers to a macro-instruction (i.e. a general instruction recognized by the decoders), which may decode into a number of micro-instructions (micro-operations).

In the depicted configuration, processor 1100 also includes on-chip interface module 1110. Historically, a memory controller, which is described in more detail below, has been included in a computing system external to processor 1100. In this scenario, on-chip interface 1110 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1100. For example in one embodiment, a memory controller hub is on the same package and/or die with processor 1100. Here, a portion of the core (an on-core portion) 1110 includes one or more controller(s) for interfacing with other devices such as memory 1175 or a graphics device 1180. The configuration including an interconnect and controllers for interfacing with such devices is often referred to as an on-core (or un-core configuration). As an example, on-chip interface 1110 includes a ring interconnect for on-chip communication and a high-speed serial point-to-point link 1105 for off-chip communication. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

In one embodiment, processor 1100 is capable of executing a compiler, optimization, and/or translator code 1177 to compile, translate, and/or optimize application code 1176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 12:
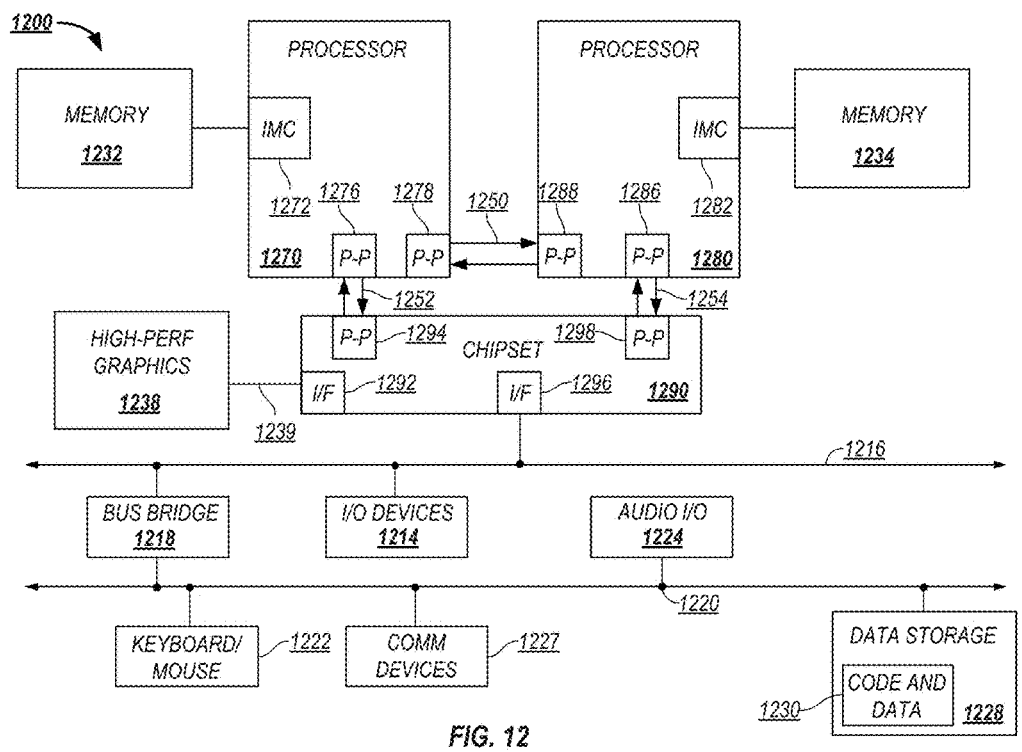
FIG. 12 illustrates another embodiment of a block diagram for a computing system.

Referring now to FIG. 12, shown is a block diagram of a second system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, the invention may be implemented within the QPI architecture.

While shown with only two processors 1270, 1280, it is to be understood that the scope of the present invention is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

Computing systems can include various combinations of components. These components may be implemented as ICs, portions thereof, discrete electronic devices, or other modules, logic, hardware, software, firmware, or a combination thereof adapted in a computer system, or as components otherwise incorporated within a chassis of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

A processor, in one embodiment, includes a microprocessor, multi-core processor, multithreaded processor, an ultra low voltage processor, an embedded processor, or other known processing element. In the illustrated implementation, processor acts as a main processing unit and central hub for communication with many of the various components of the system. As one example, processor is implemented as a system on a chip (SoC). As a specific illustrative example, processor includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor in one implementation will be discussed further below to provide an illustrative example.

Processor, in one embodiment, communicates with a system memory. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (13P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage may also couple to processor. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. A flash device may be coupled to processor, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (TO) devices may be present within system, such as a display which may be a high definition LCD or LED panel configured within a lid portion of the chassis. This display panel may also provide for a touch screen, e.g., adapted externally over the display panel such that via a user's interaction with this touch screen, user inputs can be provided to the system to enable desired operations, e.g., with regard to the display of information, accessing of information and so forth. In one embodiment, display may be coupled to processor via a display interconnect that can be implemented as a high performance graphics interconnect. Touch screen may be coupled to processor via another interconnect, which in an embodiment can be an I$^2$C interconnect. In addition to a touch screen, user input by way of touch can also occur via a touch pad which may be configured within the chassis and may also be coupled to the same I$^2$C interconnect as touch screen.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass' or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor in different manners. Certain inertial and environmental sensors may couple to processor through a sensor hub, e.g., via an I$^2$C interconnect. These sensors may include an accelerometer, an ambient light sensor (ALS), a compass and a gyroscope. Other environmental sensors may include one or more thermal sensors which in some embodiments couple to processor via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Various peripheral devices may couple to processor via a low pin count (LPC) interconnect. In the embodiment shown, various components can be coupled through an embedded controller. Such components can include a keyboard (e.g., coupled via a PS2 interface), a fan, and a thermal sensor. In some embodiments, touch pad may also couple to EC via a PS2 interface. In addition, a security processor such as a trusted platform module (TPM) in accordance with the Trusted Computing Group (TCG) TPM Specification Version 1.2, dated Oct. 2, 2003, may also couple to processor via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System can communicate with external devices in a variety of manners, including wirelessly. In some instances, various wireless modules, each of which can correspond to a radio configured for a particular wireless communication protocol, are present. One manner for wireless communication in a short range such as a near field may be via a near field communication (NFC) unit which may communicate, in one embodiment with processor via an SMBus. Note that via this NFC unit, devices in close proximity to each other can communicate. For example, a user can enable system to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

Further, additional wireless units can include other short range wireless engines including a WLAN unit and a Bluetooth unit. Using WLAN unit, Wi-Fi™ communications in accordance with a given Institute of Electrical and Electronics Engineers (IEEE) 802.11 standard can be realized, while via Bluetooth unit, short range communications via a Bluetooth protocol can occur. These units may communicate with processor via, e.g., a USB link or a universal asynchronous receiver transmitter (UART) link. Or these units may couple to processor via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit which in turn may couple to a subscriber identity module (SIM). In addition, to enable receipt and use of location information, a GPS module may also be present. WWAN unit and an integrated capture device such as a camera module may communicate via a given USB protocol such as a USB 2.0 or 3.0 link, or a UART or $I^2C$ protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP), which may couple to processor via a high definition audio (HDA) link. Similarly, DSP may communicate with an integrated coder/decoder (CODEC) and amplifier that in turn may couple to output speakers which may be implemented within the chassis. Similarly, amplifier and CODEC can be coupled to receive audio inputs from a microphone which in an embodiment can be implemented via dual array microphones (such as a digital microphone array) to provide for high quality audio inputs to enable voice-activated control of various operations within the system. Note also that audio outputs can be provided from amplifier/CODEC to a headphone jack.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC may be sent to the PCH instead of the processor during the connected standby state so that the PCH can manage the wakeup processing instead of the processor. In addition, the TSC is maintained in the PCH to facilitate sustaining processor architectural functions.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The following examples pertain to embodiments in accordance with this Specification. Example 1 is an apparatus including a set of registers, and an interface of a computing block. The computing block includes one of a physical layer block or a media access control layer block and the interface includes one or more pins to transmit asynchronous signals, one or more pins to receive asynchronous signals, and a set of pins to communicate particular signals to access the set of registers, where a set of control and status signals of a defined interface are mapped to respective bits of the set of registers.

Example 2 may include the subject matter of example 1, where the interface further includes one or more pins to transmit timing critical signals and one or more pins to receive timing critical signals.

Example 3 may include the subject matter of any one of examples 1-2, where the interface further includes a set of pins for communicating data signals.

Example 4 may include the subject matter of any one of examples 1-3, where values of the bits of the set of registers are to be used in lieu of the control and status signals.

Example 5 may include the subject matter of example 4, where the defined interface includes a PHY Interface for the Peripheral Component Interconnect Express (PCIe) architecture (PIPE) interface.

Example 6 may include the subject matter of example 5, where the interface includes fewer pins than utilized in a particular PIPE specification.

Example 7 may include the subject matter of example 6, where the interface includes less than half the number of pins of the particular PIPE specification.

Example 8 may include the subject matter of any one of examples 4-7, where the particular signal includes a command and identifies an address of a particular one of the set of registers.

Example 9 may include the subject matter of example 8, where the command includes a write and causes a value to be written to the particular register corresponding to a particular one of the set of control and status signals.

Example 10 may include the subject matter of any one of examples 1-9, where the set of control and status signals include signals for a plurality of defined interconnect protocols.

Example 11 may include the subject matter of example 10, where the plurality of defined interconnect protocols include PCIe, Universal Serial Bus (USB), and Serial Advance Technology Attachment (SATA).

Example 12 is a storage medium having code stored thereon, where the code when executed on a machine, causes the machine to receive a signal over a particular portion of an interface, where the interface couples a first computing block to a second computing block and corresponds to a defined interface between a control layer and a physical layer, the signal is received from the second computing block and includes a command, where the command identifies a particular address of a particular one of a set of registers of the first computing block to which the command is to apply and includes values to be written to one or more bits of the particular register, and the values indicate at least a particular one of a set of control and status signals of the defined interface, modify values of the one or more bits of the particular register based on the command, and interpret the modified one or more values of the particular register as receipt of the particular one of the control and status signals.

Example 13 may include the subject matter of example 12, where the command includes a write.

Example 14 may include the subject matter of example 13, where the command includes an uncommitted write and the values of the one or more bits are not to be modified until a subsequent instance of a committed write included in a subsequent transaction.

Example 15 may include the subject matter of any one of examples 12-13, where the code is further, when executed, to generate data to be sent over the particular portion of the interface to indicate an acknowledgement that the values of the one or more bits of the particular register have been modified.

Example 16 may include the subject matter of any one of examples 12-15, where the command is one of a plurality of supported commands including committed write commands, uncommitted write commands, read commands, read completions, and acknowledgement commands.

Example 17 may include the subject matter of any one of examples 12-15, where the code is further, when executed, to determine, from the command, a length of a transaction associated with the data.

Example 18 may include the subject matter of example 17, where the signal includes a first signal, the transaction includes a first transaction, and the code, when executed, is further to receive a second signal subsequent to the first signal, and determine that the second signal corresponds to a start of another transaction immediately subsequent to the first transaction based on the determined length of the transaction.

Example 19 may include the subject matter of any one of examples 12-18, where the code, when executed, is further to determine a type of the particular one of the set of control and status signals and cause the value of one or more bits to be automatically returned to a default value after the expiration of a predetermined number of unit intervals corresponding to the type of the particular one of the set of control and status signals.

Example 20 is a method including: receiving receive data over an interface to couple a first computing block to a second computing block, where the interface is according to a defined interface between a control layer and a physical layer, the signal is received from the second computing block, the data includes a command, identifies a particular address of a particular one of a set of registers of the first computing block to which the command is to apply, and includes values to be written to one or more bits of the particular register, and the data corresponds to a transaction to indicate at least a particular one of a set of control and status signals of the defined interface, modifying values of the one or more bits of the particular register based on the command, and interpreting the modified one or more values of the particular register as receipt of the particular one of the control and status signals.

Example 21 is a system including means to perform the method of example 20.

Example 22 may include the subject matter of example 21, where the means include hardware circuitry.

Example 23 is a system including a physical layer computing block including a first set of registers, and a controller computing block, where the controller computing block includes a second set of registers and an interface to couple with the physical layer computing block. The interface includes one or more pins to transmit asynchronous signals to the physical layer computing block, one or more pins to receive asynchronous signals from the physical layer computing block, and a set of pins including pins to communicate particular signals to the physical layer computing block to access the first set of registers and pins to receive signals from the physical layer computing block to permit access to the second set of registers, where a set of control and status signals of a defined interface are mapped to respective bits of the first and second sets of registers.

Example 24 may include the subject matter of example 23, where controller computing block includes a media access control layer computing block.

Example 25 may include the subject matter of example 24, where the physical layer computing block includes a Peripheral Component Interconnect Express (PCIe) physical layer.

Example 26 may include the subject matter of example 24, where the physical layer computing block includes a Universal Serial Bus (USB) physical layer.

Example 27 may include the subject matter of example 24, where the physical layer computing block includes a Serial Advance Technology Attachment (SATA) physical layer.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a set of registers;
   an interface of a computing block, wherein the computing block comprises one of a physical layer block or a media access control layer block and the interface comprises:
   one or more pins to transmit asynchronous signals;
   one or more pins to receive asynchronous signals;
   a set of pins to communicate a particular signal to access the set of registers, wherein a set of control and status signals of a defined interface are mapped to respective bits of the set of registers, and the particular signal causes a value to be written to one or more of the set of registers to indicate a particular one of the set of control and status signals in lieu of sending the particular one of the set of control and status signals.

2. The apparatus of claim 1, wherein the interface further comprises one or more pins to transmit timing critical signals and one or more pins to receive timing critical signals.

3. The apparatus of claim 1, wherein the interface further comprises a set of pins for communicating data signals.

4. The apparatus of claim 1, wherein values of the bits of the set of registers are to be used in lieu of the control and status signals.

5. The apparatus of claim 1, wherein the defined interface comprises a PHY Interface for the Peripheral Component Interconnect Express (PCIe) architecture (PIPE) interface.

6. The apparatus of claim 5, wherein the interface comprises fewer pins than utilized in a PIPE-based interconnect specification.

7. The apparatus of claim 6, wherein the interface comprises less than half the number of pins of the PIPE-based interconnect specification.

8. The apparatus of claim 1, wherein the particular signal comprises a write.

9. The apparatus of claim 1, wherein the set of control and status signals comprise signals for a plurality of defined interconnect protocols.

10. The apparatus of claim 9, wherein the plurality of defined interconnect protocols comprise PCIe, Universal Serial Bus (USB), and Serial Advance Technology Attachment (SATA).

11. At least one non-transitory machine accessible storage medium having code stored thereon, wherein the code when executed on a machine, causes the machine to:
    receive a signal over one or more particular pins of an interface, wherein the interface couples a first computing block to a second computing block and corresponds to a defined interface between a control layer and a physical layer, the signal is received from the second computing block and comprises a command, wherein the command identifies a particular address of a particular one of a set of registers of the first computing block to which the command is to apply and comprises values to be written to one or more bits of the particular register, and the values indicate at least a particular one of a set of control and status signals of the defined interface;
    modify values of the one or more bits of the particular register based on the command; and
    interpret the modified one or more values of the particular register as receipt of the particular one of the control and status signals,
    wherein the particular pins are designated for signals to modify values of the particular register, and the number of control and status signals of the defined interface are fewer than the number of the one or more particular pins.

12. The storage medium of claim 11, wherein the command comprises an uncommitted write and the values of the one or more bits are not to be modified until a subsequent instance of a committed write in a subsequent transaction.

13. The storage medium of claim 11, wherein the code is further, when executed, to generate data to be sent over the particular pins of the interface to indicate an acknowledgement that the values of the one or more bits of the particular register have been modified.

14. The storage medium of claim 11, wherein the command is one of a plurality of supported commands comprising committed write commands, uncommitted write commands, read commands, read completions, and acknowledgement commands.

15. The storage medium of claim 11, wherein the code, when executed, is further to determine, from the command, a length of a transaction associated with the signal.

16. The storage medium of claim 15, wherein the signal comprises a first signal, the transaction comprises a first transaction, and the code, when executed, is further to:
receive a second signal subsequent to the first signal;
determine that the second signal corresponds to a start of another transaction immediately subsequent to the first transaction based on the determined length of the transaction.

17. The storage medium of any one of claim 11, wherein the code, when executed, is further to determine a type of the particular one of the set of control and status signals and cause the value of one or more bits to be automatically returned to a default value after the expiration of a predetermined number of unit intervals corresponding to the type of the particular one of the set of control and status signals.

18. A system comprising:
a physical layer computing block comprising a first set of registers;
a controller computing block, wherein the controller computing block comprises a second set of registers and an interface to couple with the physical layer computing block and the interface comprises:
one or more pins to transmit asynchronous signals to the physical layer computing block;
one or more pins to receive asynchronous signals from the physical layer computing block; and
a set of pins comprising pins to communicate particular signals to the physical layer computing block to access the first set of registers and pins to receive signals from the physical layer computing block to permit access to the second set of registers, wherein a set of control and status signals of a defined interface are mapped to respective bits of the first and second sets of registers, and the set of pins is smaller in number than the set of control and status signals.

19. The system of claim 18, wherein the controller computing block comprises a media access control layer computing block.

20. The system of claim 18, wherein the physical layer computing block comprises one of a Peripheral Component Interconnect Express (PCIe) physical layer, a Universal Serial Bus (USB) physical layer, and a Serial Advance Technology Attachment (SATA) physical layer.

* * * * *